United States Patent
Bhogal et al.

(10) Patent No.: US 9,141,264 B2
(45) Date of Patent: *Sep. 22, 2015

(54) VARIABLE REFRESH RATES FOR PORTIONS OF SHARED SCREENS

(75) Inventors: Kulvir S. Bhogal, Pflugerville, TX (US);
Gregory J. Boss, Saginaw, MI (US);
Rick A. Hamilton, II, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 762 days.

This patent is subject to a terminal disclaimer.

(21) Appl. No.: 13/325,950

(22) Filed: Dec. 14, 2011

(65) Prior Publication Data

US 2013/0159874 A1 Jun. 20, 2013

(51) Int. Cl.
*G06F 3/00* (2006.01)
*G06F 3/0484* (2013.01)
*G06F 3/14* (2006.01)
*G09G 5/14* (2006.01)

(52) U.S. Cl.
CPC ............ *G06F 3/0484* (2013.01); *G06F 3/1454* (2013.01); *G09G 5/14* (2013.01); *G09G 2370/025* (2013.01)

(58) Field of Classification Search
None
See application file for complete search history.

(56) References Cited

U.S. PATENT DOCUMENTS

| | | | |
|---|---|---|---|
| 5,572,648 A | 11/1996 | Bibayan | |
| 5,799,292 A | 8/1998 | Hekmatpour | |
| 5,864,819 A | 1/1999 | De Armas et al. | |
| 6,052,676 A | 4/2000 | Hekmatpour | |
| 6,059,842 A * | 5/2000 | Dumarot et al. | 717/153 |
| 6,292,174 B1 * | 9/2001 | Mallett et al. | 345/163 |
| 6,654,032 B1 | 11/2003 | Zhu et al. | |
| 6,714,778 B2 | 3/2004 | Nykanen et al. | |
| 6,928,461 B2 * | 8/2005 | Tuli | 709/203 |
| 7,103,836 B1 | 9/2006 | Nakamura et al. | |
| 7,203,708 B2 | 4/2007 | Liu et al. | |
| 7,216,002 B1 | 5/2007 | Anderson | |
| 7,275,116 B1 | 9/2007 | Hanmann et al. | |
| 7,340,534 B2 | 3/2008 | Cameron et al. | |
| 7,360,166 B1 * | 4/2008 | Krzanowski | 715/767 |

(Continued)

FOREIGN PATENT DOCUMENTS

| | | |
|---|---|---|
| CN | 101567858 A | 4/2011 |
| EP | 0961197 A1 | 1/1999 |

(Continued)

OTHER PUBLICATIONS

Office action regarding U.S. Appl. No. 13/668,294, dated Feb. 28, 2014, 15 pages.

(Continued)

*Primary Examiner* — Stephen Alvesteffer
(74) *Attorney, Agent, or Firm* — Yee & Associates, P.C.; Damion Josephs

(57) ABSTRACT

Illustrative embodiments disclose setting refresh rates for different portions of a shared screen in a sharing session. A processor sets an initial refresh rate for the sharing session. The processor selects a portion of the shared screen. The processor selects a refresh rate for the selected portion of the shared screen that is different from the initial refresh rate for the sharing session. The processor refreshes the selected portion based on the selected refresh rate and a portion not selected based on the initial refresh rate.

11 Claims, 9 Drawing Sheets

(56) References Cited

U.S. PATENT DOCUMENTS

| | | | |
|---|---|---|---|
| 7,386,801 B1* | 6/2008 | Horvitz et al. | 715/764 |
| 7,454,386 B2 | 11/2008 | Chakraborty | |
| 7,530,020 B2 | 5/2009 | Szabo | |
| 7,620,621 B2 | 11/2009 | Fuselier et al. | |
| 7,660,604 B2 | 2/2010 | Ueda | |
| 7,672,873 B2 | 3/2010 | Kindig et al. | |
| 7,743,135 B2 | 6/2010 | Azuma | |
| 7,757,114 B2 | 7/2010 | Watanabe | |
| 7,801,896 B2 | 9/2010 | Szabo | |
| 7,853,900 B2* | 12/2010 | Nguyen et al. | 715/861 |
| 7,860,962 B2 | 12/2010 | White et al. | |
| 7,925,616 B2 | 4/2011 | Hurwood et al. | |
| 8,225,229 B2* | 7/2012 | Thorn et al. | 715/802 |
| 8,312,385 B2 | 11/2012 | Bier | |
| 8,527,588 B2 | 9/2013 | Beck et al. | |
| 8,903,768 B2 | 12/2014 | Bhogal et al. | |
| 9,086,788 B2 | 7/2015 | Bhogal et al. | |
| 2002/0083092 A1 | 6/2002 | Simpson | |
| 2002/0140719 A1 | 10/2002 | Amir et al. | |
| 2003/0222876 A1 | 12/2003 | Giemborek et al. | |
| 2003/0222890 A1 | 12/2003 | Salesin et al. | |
| 2004/0044691 A1 | 3/2004 | Wajda | |
| 2004/0253991 A1 | 12/2004 | Azuma | |
| 2005/0004885 A1 | 1/2005 | Pandian et al. | |
| 2005/0132045 A1 | 6/2005 | Hornback et al. | |
| 2005/0138540 A1 | 6/2005 | Baltus et al. | |
| 2005/0197906 A1 | 9/2005 | Kindig et al. | |
| 2006/0002315 A1 | 1/2006 | Theurer et al. | |
| 2006/0014546 A1 | 1/2006 | Bodin et al. | |
| 2006/0041686 A1 | 2/2006 | Caspi et al. | |
| 2006/0056304 A1 | 3/2006 | Moore | |
| 2006/0066503 A1* | 3/2006 | Sampsell et al. | 345/1.1 |
| 2006/0136828 A1 | 6/2006 | Asano | |
| 2006/0184508 A1 | 8/2006 | Fuselier et al. | |
| 2006/0288023 A1 | 12/2006 | Szabo | |
| 2007/0132727 A1* | 6/2007 | Garbow et al. | 345/157 |
| 2007/0288584 A1* | 12/2007 | Tsai et al. | 709/208 |
| 2008/0005233 A1 | 1/2008 | Cai et al. | |
| 2008/0018582 A1* | 1/2008 | Yang et al. | 345/98 |
| 2008/0034320 A1 | 2/2008 | Ben-Shachar et al. | |
| 2008/0133769 A1* | 6/2008 | Salesky et al. | 709/233 |
| 2008/0154907 A1 | 6/2008 | Prasad et al. | |
| 2008/0246775 A1* | 10/2008 | Fisher et al. | 345/589 |
| 2008/0275871 A1 | 11/2008 | Berstis et al. | |
| 2008/0288992 A1* | 11/2008 | Usman et al. | 725/105 |
| 2009/0012821 A1* | 1/2009 | Besson et al. | 705/3 |
| 2009/0013045 A1 | 1/2009 | Maes et al. | |
| 2009/0226152 A1 | 9/2009 | Hanes | |
| 2009/0300020 A1 | 12/2009 | Chen et al. | |
| 2009/0313329 A1 | 12/2009 | Agrawal et al. | |
| 2010/0010921 A1 | 1/2010 | Liu et al. | |
| 2010/0131523 A1 | 5/2010 | Yu et al. | |
| 2010/0235285 A1 | 9/2010 | Hoffberg | |
| 2011/0029482 A1 | 2/2011 | Gimson et al. | |
| 2011/0029658 A1 | 2/2011 | Werth et al. | |
| 2011/0043652 A1 | 2/2011 | King et al. | |
| 2011/0078532 A1* | 3/2011 | Vonog et al. | 714/752 |
| 2011/0078615 A1 | 3/2011 | Bier | |
| 2011/0085211 A1 | 4/2011 | King et al. | |
| 2011/0173256 A1 | 7/2011 | Khalatian | |
| 2011/0173266 A1 | 7/2011 | Ohashi et al. | |
| 2011/0195667 A1 | 8/2011 | Hassan et al. | |
| 2011/0258574 A1* | 10/2011 | Adams | 715/781 |
| 2011/0314387 A1* | 12/2011 | Gold et al. | 715/751 |
| 2012/0004960 A1 | 1/2012 | Ma et al. | |
| 2012/0016770 A1 | 1/2012 | Thomas | |
| 2012/0050320 A1 | 3/2012 | Verbeque et al. | |
| 2012/0084866 A1 | 4/2012 | Stolfo | |
| 2012/0182384 A1 | 7/2012 | Anderson et al. | |
| 2013/0151624 A1 | 6/2013 | Bhogal et al. | |
| 2013/0151973 A1 | 6/2013 | Bhogal et al. | |
| 2013/0151976 A1 | 6/2013 | Bhogal | |
| 2013/0159021 A1 | 6/2013 | Felsher | |
| 2013/0159822 A1* | 6/2013 | Grossman et al. | 715/201 |
| 2013/0159880 A1 | 6/2013 | Bhogal et al. | |
| 2013/0326576 A1 | 12/2013 | Zhang et al. | |
| 2014/0075331 A1 | 3/2014 | Bhogal et al. | |
| 2014/0075341 A1 | 3/2014 | Bhogal et al. | |
| 2014/0082518 A1 | 3/2014 | Bhogal et al. | |
| 2014/0100927 A1 | 4/2014 | Bhogal et al. | |
| 2014/0101253 A1 | 4/2014 | Bhogal et al. | |
| 2014/0129520 A1 | 5/2014 | Bhogal et al. | |

FOREIGN PATENT DOCUMENTS

| | | |
|---|---|---|
| JP | 11327523 A | 11/1999 |
| JP | 2005348262 A | 12/2005 |
| JP | 2006268638 A | 10/2006 |
| JP | 2006338531 A | 12/2006 |
| JP | 2008234072 A | 10/2008 |
| JP | 2009205278 A | 9/2009 |
| JP | 2011100270 A | 5/2011 |
| WO | 0198888 A2 | 12/2001 |
| WO | 0209086 A1 | 1/2002 |
| WO | 02054192 A2 | 7/2002 |
| WO | 2006127430 A1 | 11/2006 |
| WO | 2011161735 A1 | 12/2011 |

OTHER PUBLICATIONS

Office action regarding U.S. Appl. No. 13/668,294, dated Dec. 27, 2013, 15 pages.

Notice of allowance dated Apr. 22, 2014, regarding U.S. Appl. No. 13/323,681, 10 pages.

Office action dated Nov. 27, 2013, regarding U.S. Appl. No. 13/323,681, 20 pages.

Architecture for a Dynamic Information Area Control, IBM Technical Disclosure Bulletin, IBM Corp. New York, NY, 37 (10):245-246, Oct. 1, 1994.

Au et al., "Netscape Communicator's Collapsible Toolbars," In: CHI '98, Human Factors in Computing Systems, Conference Proceedings, ACM Press, New York, NY, pp. 81-86, Apr. 18, 1998.

Reimer et al., "Presence-Based, Context-Sensitive Real-Time Collaboration (RTC)—Research Directions for a New Type of eCollaboration System," 19th Bled eConference, eValues, Bled, Slovenia, Jun. 5-7, 2006, 16 pages.

Sato et al., "XFIG Version 3.2 Patchlevel 2 Users Manual," 4 pages. http://www.math.unm.edu/xfig/index.html, Jul. 2, 1998.

"Create Custom Shows within a Presentation in PowerPoint," Microsoft Corporation, http://www.office.microsoft.com/en-us/powerpoint-help/creat-custom-shows-within-a-presentation, accessed Mar. 12, 2012, 1 page.

Porst, "X.5 iChat," Quarter Life Crisis—The World According to Sven-S. Porst, http://earthlingsoft.net/ssp/blog12007112/x5_chat, accessed Mar. 12, 2012, 20 pages.

Yun, "Manage and Monitor Meeting Bandwidth," Acrobat® Connect Pro User Community, http://www.connectusers.com/tutorials/2009/03/connection_status/index.php?format, accessed Mar. 12, 2012, 5 pages.

U.S. Appl. No. 13/323,696, filed Dec. 12, 2012, 31 pages.

U.S. Appl. No. 13/323,711, filed Dec. 14, 2012, 31 pages.

U.S. Appl. No. 13/326,007, filed Dec. 14, 2012, 31 pages.

Bhogal et al., "Customizing a Presentation Based on Preferences of an Audience," U.S. Appl. No. 14/076,584, filed Nov. 11, 1013, 28 pages.

Bhogal et al., "Providing Feedback for Screen Sharing," U.S. Appl. No. 14/077,333, filed Nov. 12, 2013, 28 pages.

Bhogal et al., "Variable Refresh Rates for Portions of Shared Screens," U.S. Appl. No. 14/082,123, filed Nov. 16, 2013, 35 pages.

Bhogal et al., "Dynamic Screen Sharing for Optimal Performance," U.S. Appl. No. 14/082,128, filed Nov. 16, 2013, 2013, 31 pages.

Office Action, dated Aug. 15, 2014, regarding U.S. Appl. No. 14/082,123, 30 pages.

Office Action, dated Sep. 11, 2014, regarding U.S. Appl. No. 13/323,696, 28 pages.

Notice of Allowance, dated Jul. 29, 2014, regarding U.S. Appl. No. 13/668,294, 19 pages.

Office Action, dated Feb. 27, 2015, regarding U.S. Appl. No. 13/326,007, 40 pages.

(56) References Cited

OTHER PUBLICATIONS

Final Office Action, dated Feb. 27, 2015, regarding U.S. Appl. No. 14/082,123, 20 pages.
Office Action, dated Mar. 6, 2015, regarding U.S. Appl. No. 14/082,128, 40 pages.
Notice of Allowance, dated Mar. 13, 2015, regarding U.S. Appl. No. 14/082,132, 51 pages.
Final Office Action, dated Feb. 12, 2015, regarding U.S. Appl. No. 13/323,696, 25 pages.
Notice of Allowance, dated May 8, 2015, regarding U.S. Appl. No. 14/082,123, 14 pages.
Notice of Allowance, dated Apr. 24, 2015, regarding U.S. Appl. No. 13/326,007, 14 pages.
Notice of Allowance, dated Apr. 28, 2015, regarding U.S. Appl. No. 14/082,128, 14 pages.
Office Action, dated May 21, 2015, regarding U.S. Appl. No. 13/323,696, 28 pages.

* cited by examiner

VARIABLE REFRESH RATES FOR PORTIONS OF SHARED SCREENS

FIELD

The disclosure relates generally to sharing portions of a display of a data processing system and more specifically to determining refresh rates for shared portions of a shared screen of a sharing session.

DESCRIPTION OF THE RELATED ART

Screen sharing applications transfer a copy of a shared screen a rate of speed called a refresh rate. Currently these screen sharing applications use the same refresh rate for the entire shared screen for the duration of a sharing session. During these sharing sessions, screen sharing applications do not discriminate between different windows displayed on the shared screen. All portions of the shared screen are transferred by screen sharing applications using the same refresh rate. Unimportant portions, such as unused windows or irrelevant parts of a window, are transferred at the same refresh rate as important portions.

Using the same refresh rate for the entire shared screen can lead to performance problems. For example, if using a low bandwidth connection, a user may experience a slow "painting" of the shared screen and other latency problems. A user can miss important data when it is presented late or not at all due to these performance problems.

Therefore, it would be advantageous to have a method and apparatus that takes into account at least some of the issues discussed above, as well as possibly other issues.

SUMMARY

In one illustrative embodiment, a processor sets refresh rates for different portions of a shared screen in a sharing session is provided. A processor sets an initial refresh rate for the sharing session. The processor selects a portion of the shared screen. The processor selects a refresh rate for the selected portion of the shared screen that is different from the initial refresh rate for the sharing session. The processor refreshes the selected portion based on the selected refresh rate and a portion not selected based on the initial refresh rate.

DETAILED DESCRIPTION

Figure 1:
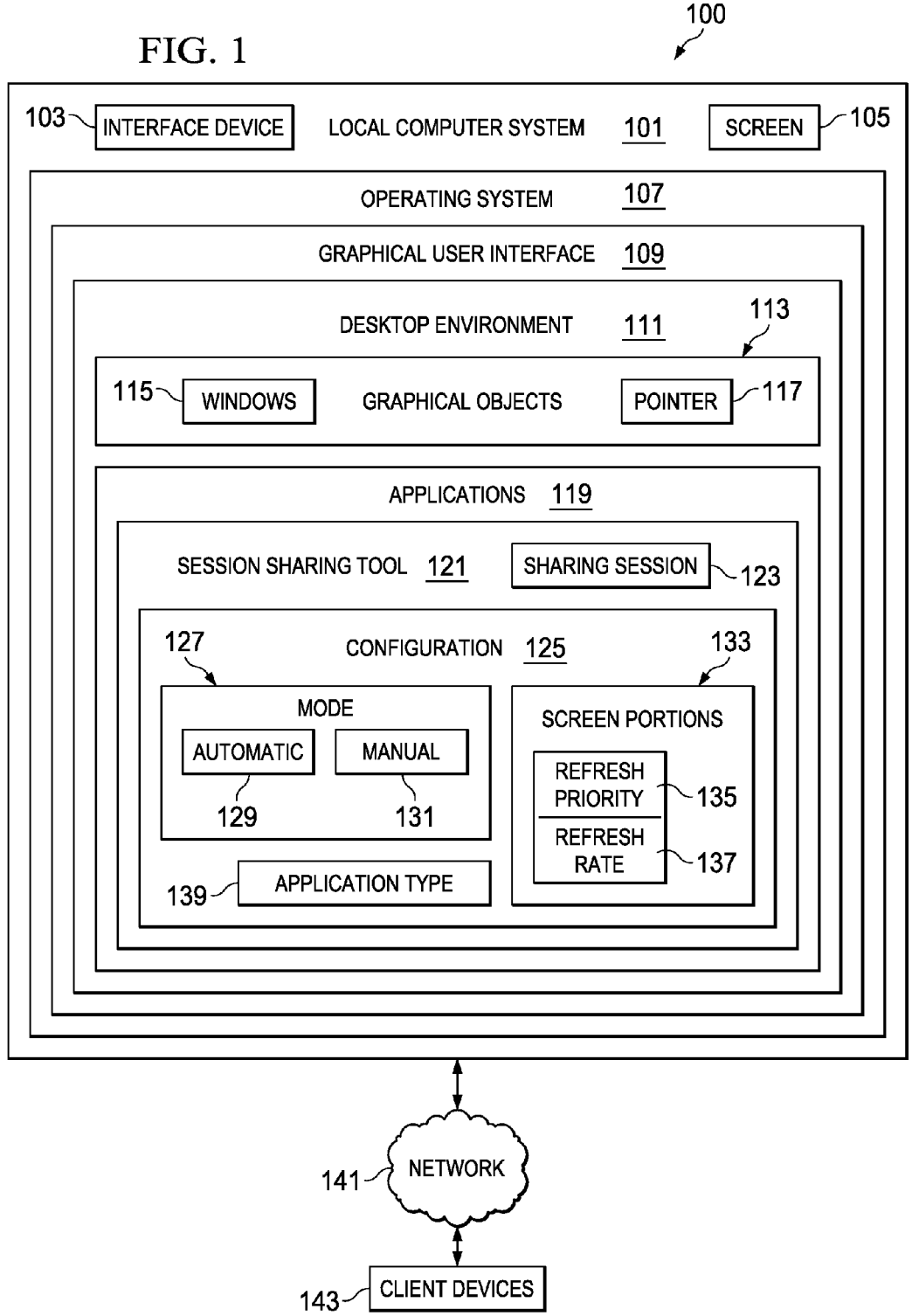
FIG. 1 is an illustration of a block diagram of a session sharing environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible computer readable medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of modern state-of-the-art data processing system often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

Although GUIs have made manipulation of data easier for users in some instances, GUIs have created new problems. For example, a user working in an application frequently selects items from an application menu toolbar. This interaction will require the user to move a pointer via a mouse over a graphical object such as a menu, icon, or control to make a selection.

The term "mouse," when used in this document, refers to any type of operating system supported graphical pointing device including, but not limited to: a mouse, track ball, touch pad, light pin, touch screen, and the like. A pointing device is typically employed by a user of the data processing system to interact with the data processing system's GUI. A "pointer" is an iconic image controlled by a mouse or other such device, and is displayed on the video display device of a data processing system to visually indicate to the user icons, menus, or other types of graphical objects that may be selected or manipulated.

Turning now to FIG. 1, an illustration of a block diagram of a session sharing environment is depicted in accordance with an illustrative embodiment. It should be appreciated that FIG. 1 is only provided as an illustration of one implementation and is not intended to imply any limitation with regard to the environment in which different embodiments may be implemented. Many modifications to the depicted environment may be made.

As depicted, session sharing environment 100 includes local computer system 101. As depicted, local computer system 101 includes interface device 103 and screen 105. Interface device 103 includes, for example, a computer mouse, touchscreen, trackball, pointing stick, touchpad, or keyboard. Screen 105 includes, for example, any display device for presenting visual data to a user of local computer system 101. As used herein, "computer system" means any type of data processing system, such as, for example, a computer, laptop, notebook, mobile phone, or tablet.

As depicted, local computer system 101 utilizes operating system 107 to function. As used herein "operating system" means a set of programs for managing computer hardware resources and application software. In these illustrative examples, operating system 107 includes, for example, Linux®, Android®, iOS®, MAC OS X®, Microsoft Windows®, and any other system for managing computer hardware resources and application software. As depicted, operating system 107 includes graphical user interface (GUI) 109, such as commonly encountered in a Windows® or MAC OS X® environment, and typically reacts to a clickable input from interface device 103 on local computer system 101 to receive command and control user inputs. As used herein "set of" means one or more.

As depicted, graphical user interface 109 comprises desktop environment 111. As defined and used herein, desktop environment 111 refers to a style of graphical user interface (GUI) 109 derived from a metaphor to a desktop seen on most modern personal computers allowing a user to easily access, configure, and modify features of operating system 103. As depicted, desktop environment 111 consists of graphical objects 113 including windows 115 and pointer 117. As depicted, desktop environment 111 also includes applications 119. As depicted, applications 119 includes, for example, session sharing tool 121. In these illustrative embodiments, session sharing tool 121 can establish sharing session 123, in which a user of local computer system 101 can share desktop environment 111 with other computers using a communication link.

As depicted, session sharing tool 121 comprises configuration 125. As depicted, configuration 125 comprises a mode 127, which in these illustrative examples includes automatic 129 and manual 131. As depicted, session sharing tool 121 also comprises screen portions 133, which, in these illustrative examples comprises refresh priority 135 and refresh rate 137. In these illustrative examples, application type 139 organizes applications 119 by type and can be used by session sharing tool 121 to configure operating system 107 and select refresh priority 135 and refresh rate 137 for each of application of applications 119. As depicted, local computer system 101 can communicate over network 141 with client devices 143. Session sharing tool 121 can be used to initiate sharing session 123 with a set of client devices 143.

In these illustrative examples, configuration 125 allows local computer system 101 to configure operating system 107 to select and set portions of screen 105, i.e., screen portions 133, to refresh at different rates. "Refresh rate" 137 as used and defined herein, refers to the number of times in a second that session sharing tool 105 transmits data to redraw a frame, i.e., draws a frame on client devices 143 in sharing session 123. The number of times session sharing tool 121 transmits a portion of screen 105 to refresh that portion is thus refresh rate 137. This measured value is not to be confused with frame rate, in that refresh rate 137 includes the repeated drawing of identical frames, while frame rate measures how often an entire frame of new data is transmitted. Nor is frame rate 137 to be confused with the more common meaning associated with frame rate, which is the number of times in a second that a display draws the data on screen 105 of local computer system 101. In these illustrative examples, refresh priority 135 is a priority assigned to screen portions 133 setting relative priorities of screen portions 133. As used herein, and depicted, refresh priority 135 and refresh rate 137 are closely interrelated concepts and can be used interchangeably. That is, setting refresh priority 135 can be interpreted as setting refresh rate 137 and vice versa. For example, in these illustrative examples, a "high" designation for refresh priority 135 can set a corresponding refresh rate 137 of 2 Hz, and setting refresh rate 137 to 0.10 Hz can translate into a "low" refresh priority 135. That is, refresh rate 137 or refresh priority 135 are, for example, abstracted to "high", "medium, and "low."

In these illustrative examples, mode 127 can be selected as either automatic 129 or manual 131. In these illustrative examples, mode 127 set to automatic 129 results in operating system 107 functioning to automatically select portions 133 and refresh rate 137 based on application type 139 or the active or current window of windows 115. In these illustrative examples, mode 127 set to manual 131 results in operating system 107 functioning to accept user inputs to select portions 133 and refresh rate 137.

In these illustrative examples, network 141 connects local computer system 101 with client devices 143. As depicted, network 141 supports communication between local computer system 101 and client devices 143. In these illustrative examples, a user of local computer system 101 establishes a communication link over network 141 to client devices 143 using session sharing tool 121 for interacting with desktop environment 111. Session sharing tool 121 facilitates sharing windows 115 between local computing system 101 and client devices 143.

In these illustrative examples, application type 139 can include, for example, productivity programs, such as word processor, spreadsheet, accounting, publishing, computer aided designs, graphics design, and computer animation programs, as well as any other productivity program in desktop environment 111. In these illustrative examples, application type 139 can also include, for example, entertainment programs, such as for example, games and multimedia applications. As depicted, session sharing tool 121 can be used to share windows 115 displaying information for active applications 119. "Active applications" as used herein means a set of applications 119 currently open and available for use by a user with an application window currently available and accessible in graphical user interface 109 on screen 105. In these illustrative examples, session sharing tool 121 operates to capture data on local computer system 101 for screen 105 and selected ones of screen portions 133 to transmit to client devices 143 at selected refresh rates. The data for screen 105 and selected ones of screen portions 133 can be copied from the output port providing graphical data to screen 105 and then selectively transmitted using session sharing tool 121 at a selected refresh rate 137 for each one of screen portions 133. For example, screen 105 can be transmitted at a "low" rate of 0.1 Hz, and a first portion of screen portions 133 transmitted at a "high" rate of 2 Hz, and a second portion of screen portions 133 at a "medium" rate of 0.9 Hz.

Figure 2:
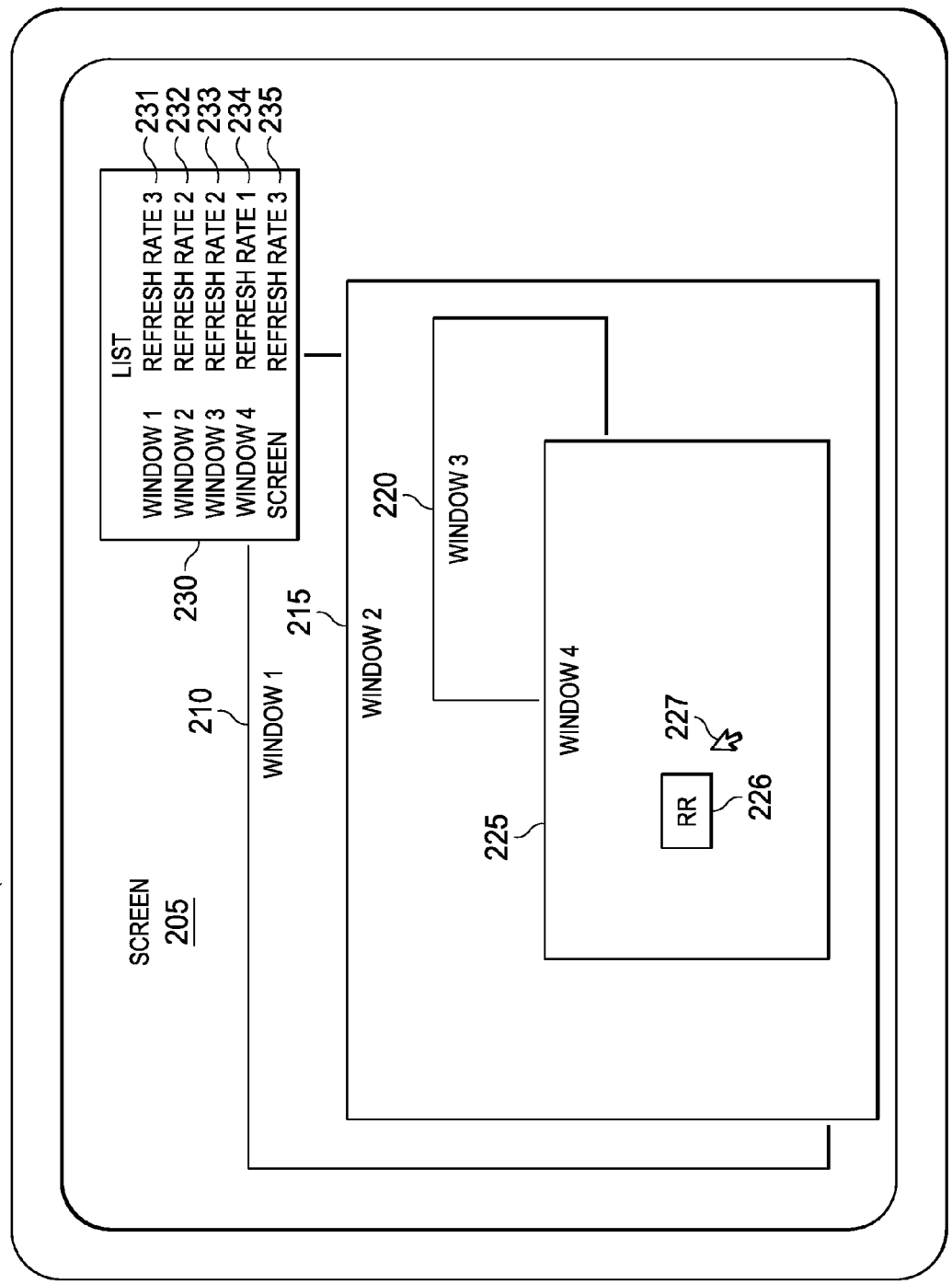
FIG. 2 is an illustration of a screen on the local computer system in accordance with an illustrative embodiment.

Turning now to FIG. 2, an illustration of a computer screen on a local computer in accordance with an illustrative embodiment is depicted. It should be appreciated that FIG. 2 is only provided as an illustration of one implementation and is not intended to imply any limitation with regard to the computer displays in which different embodiments may be implemented. Many modifications to the depicted computer screen may be made.

As depicted, screen on local computer 200 shows an illustrative example of a view of a computer screen implemented with windows. As depicted, with reference to FIG. 1, screen 205 on local computer system 101 comprises a number of features providing visual data and control interfaces to a user of local computer system 101. As depicted, screen 205 includes five windows 115—screen 205, window 1 210, window 2 215, window 3 220, and window 4 225. In these illustrative examples, each of windows 115 window 1 210, window 2 215, window 3 220, and window 4 225 can be associated with one of the applications of applications 119. In these illustrative examples, window 4 225 includes a refresh rate (RR) popup selection box 226 for selecting the refresh rate of window 4 225, and each of windows 115 can likewise have a refresh rate selection popup presented for a user to select a refresh rate. Alternatively, as depicted, list 230 can be displayed as a popup window comprised of widow 1 refresh rate 1 231, window 2 refresh rate 2 232, window 3 refresh rate 2 233, window 4 refresh rate 3 234, and screen refresh rate 3 235 to use to select a refresh rate 137. As depicted, widow 1 refresh rate 3 231 represents a "low" refresh rate 137. Window 2 refresh rate 2 232 and window 3 refresh rate 2 233 represent an identical "medium" refresh rate 137. Window 4 refresh rate 1 234 represents a "high" refresh rate 137, and screen refresh rate 3 235 represents a "low" refresh rate 137. As depicted, refresh rates can be selected using one of either list 230 or refresh rate popup selection box 226. In these illustrative examples, refresh rate (RR) 226, widow 1 refresh rate 231, window 2 refresh rate 232, window 3 refresh rate 233, window 4 refresh rate 234, and screen refresh rate 235 can be selected automatically, such as by default for example, or manually. For example, in one example embodiment, a user can be presented refresh rate popup selection box 226 for the user to manually enter or choose a refresh rate for window 4 225. In a different example embodiment, a user can be presented list 230 in a popup window and the user can enter or choose a refresh rate for each window on screen 205, including screen 205. For example, the user may enter a refresh rate by numerical value or an abstracted rate such as, for example, "high", "medium", or "low". Additionally, rather than a refresh rate 137, a user can choose a refresh priority 135 value. Refresh rate 137 can also be selected automatically, such as, for example, using a default rate based on application type 139. As depicted, pointer 227 can be used to interface with operating system 107 through graphical user interface 109.

Figure 3:
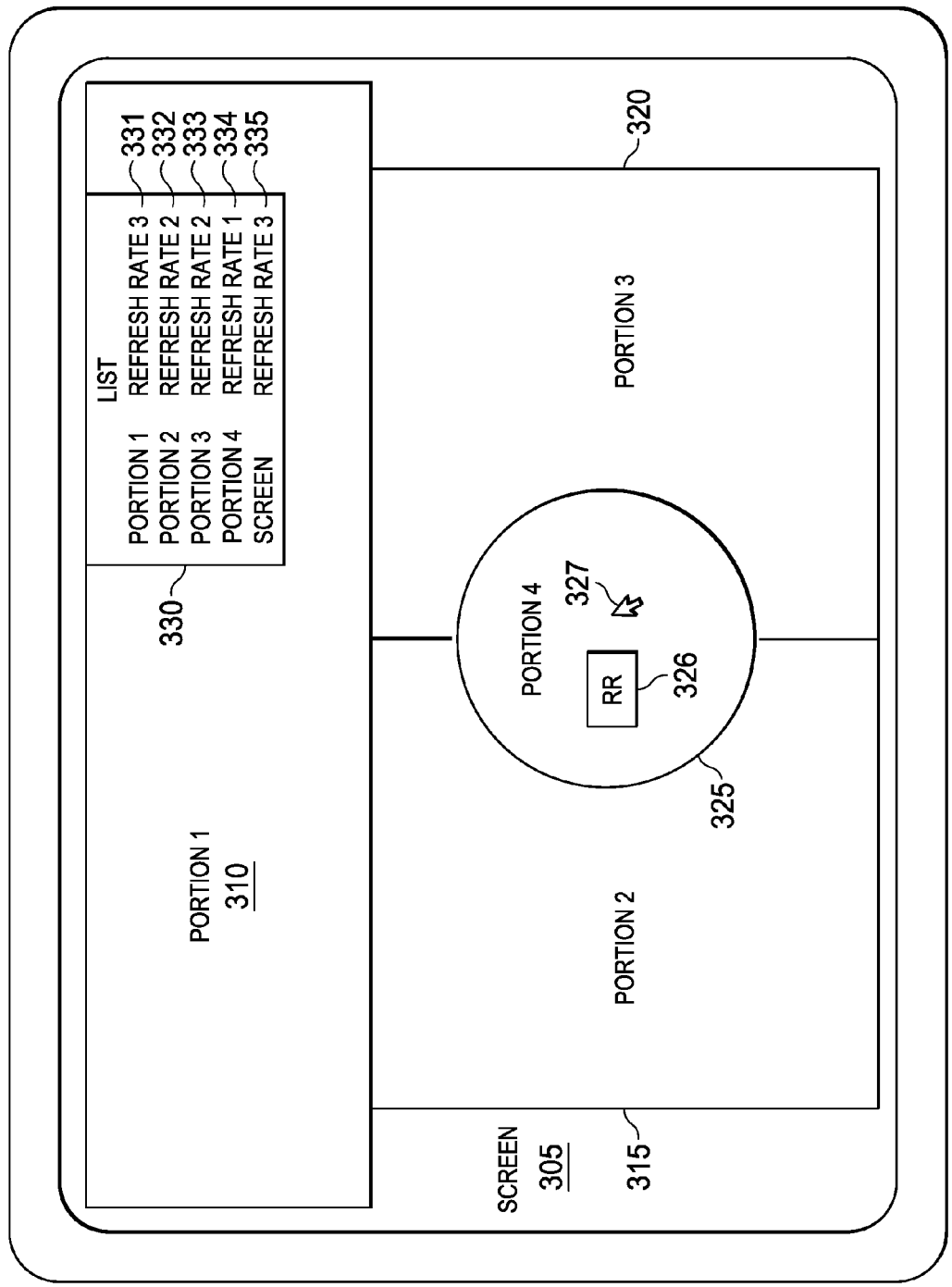
FIG. 3 is an illustration of a screen on the local computer system in accordance with an illustrative embodiment.

Turning now to FIG. 3, an illustration of a computer screen on a local computer in accordance with an illustrative embodiment is depicted. It should be appreciated that FIG. 3 is only provided as an illustration of one implementation and is not intended to imply any limitation with regard to the computer displays in which different embodiments may be implemented. Many modifications to the depicted computer screen may be made.

As depicted, screen on local computer 300 shows an illustrative example of a view of a computer screen implemented on portions, rather than windows. As depicted, with reference to FIG. 1, screen 305 on local computer system 101 comprises a number of features providing visual data and control interfaces to a user of local computer system 101. As depicted, screen 305 includes four portions of screen 305 portion 1 310, portion 2 315, portion 320, and portion 4 325 as well as screen 305 itself. In these illustrative examples, a different refresh rate 137 can be selected for each portion of portion 1 310, portion 2 315, portion 320, portion 4 325, and screen 305 itself. As depicted, portion 4 325 has a refresh rate (RR) selection popup box 326, and each of portion 1 310, portion 2 315, portion 3 320, portion 4 325, and screen 305 itself can likewise have a refresh rate selection box 326 presented for a user to select refresh rate 137. Alternatively, as depicted, list 330 can be displayed as a popup window for selecting refresh rates. As depicted, portion 1 refresh rate 3 331, portion 2 refresh rate 2 332, portion 3 refresh rate 2 333, portion 4 refresh rate 1 334, and screen refresh rate 3 335 to use to select a refresh rate 137. As depicted, portion 1 refresh rate 3 331 represents a "low" refresh rate 137, portion 2 refresh rate 2 332 represents a "medium" refresh rate 137, portion 3 refresh rate 2 333 also represents a "medium" refresh rate 137, portion 4 refresh rate 1 334 represents a "high" refresh rate 137, and screen refresh rate 3 335 represents a "low" refresh rate 137. As depicted, refresh rates can be selected using one of either list 330 or refresh rate popup selection box 326. As depicted, pointer 327 can be used to interface with operating system 107 through graphical user interface 109. Additionally, in these illustrative examples, portion 4 325 can be designated as a circle having a selected radius, and as an area of regular and irregular shapes. As depicted, portion 4 325 may be identified by a user using pointer 327. Portion 4 325 may also move with pointer 327, so that portion 4 325 and associated portion 4 refresh rate 1 334, moves as pointer 327 moves on screen 305.

In these illustrative examples, refresh rate (RR) 326, portion 1 refresh rate 3 331, portion 2 refresh rate 2 332, portion 3 refresh rate 2 333, and portion 4 refresh rate 3 334 can be selected automatically, as a default, or manually by a user. For example, in one example embodiment, a user can be presented refresh rate popup selection box 326 for the user to manually enter or choose a refresh rate for portion 4 225. In a different example embodiment, a user can be presented list 330 in a popup window and the user can enter or choose a refresh rate for each portion on screen 305, including screen 305. For example, the user may enter a refresh rate by numerical value or an abstracted rate such as, for example, "high", "medium", or "low". Additionally, rather than a refresh rate 137, a user can choose a refresh priority 135 value. Refresh rate 137 can also be selected automatically, such as, for example, using a default rate based on application type 139 associated with the particular portion or according to a hierarchy with portion 4 refresh rate 3 334 receiving the highest refresh rate 137 and screen 305 receiving the lowest refresh rate 137.

It should be appreciated also that portion 1 310, portion 2 315, portion 320, and portion 4 325 can be implemented as areas of windows 115, and indeed windows 115 can be regarded as portions of screen 105, with the terms portion and window used interchangeable. In these illustrative examples, portion 1 310, portion 2 315, portion 320, and portion 4 325 can be manually selected by a user, such as by, for example, partitioning screen 105 using pointer 327. As depicted, each portion may be a portion of screen 305 or a portion of a window in screen 305. In these illustrative examples, As depicted, Each portion may be a portion of screen 305 or a portion of a window in screen 305. In these illustrative examples, each of portions portion 1 310, portion 2 315, portion 320, and portion 4 325 overlays a portion of screen 305 or a portion of an application window or windows 115 and each can possess a different refresh rate 137. For example any information in a window overlaid by portion 4 325 refreshes at refresh rate 334 for portion 4 325. Additionally, refresh rate 137 for the portion is selected from the higher of refresh rate 137 of portion 4 325 or the underlying window. Furthermore, in these illustrative examples, refresh rate 137 may be selected from the lower refresh rate 137 of portion 4 325 or the underlying window.

Figure 4:
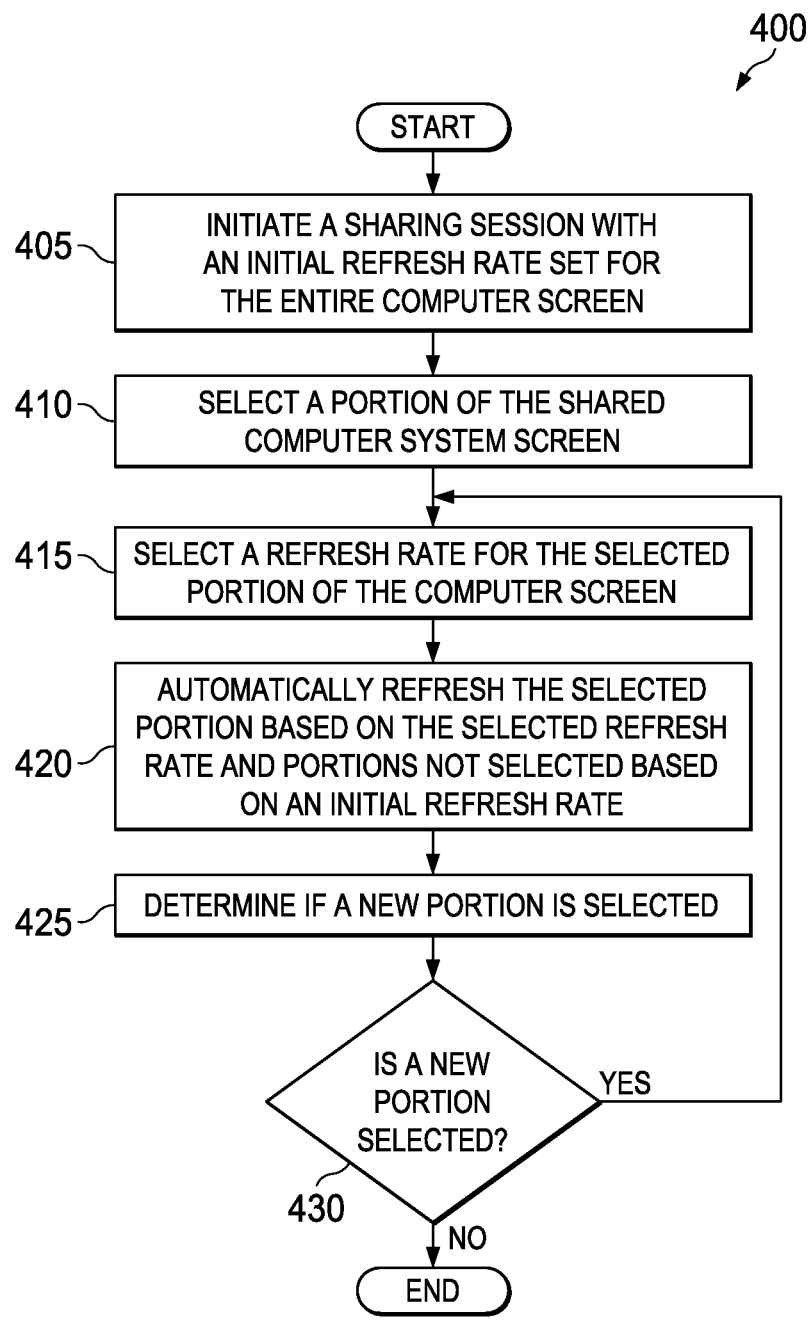
FIG. 4 is an illustration of a flowchart of a session sharing process in accordance with an illustrative embodiment.

In FIG. 4, an illustration of a flowchart of a session sharing process in accordance with an illustrative embodiment is depicted. It should be appreciated that FIG. 4 is only provided as an illustration of one implementation and is not intended to imply any limitation with regard to the session sharing process in which different embodiments may be implemented. Many modifications to the depicted session sharing process may be made.

As depicted, session sharing process 400 can be implemented in session sharing tool 121 of FIG. 1. With references to elements in FIG. 1, as depicted, the process begins when local computer system 101 initiates sharing session 123 with an initial refresh rate set for the entire computer screen 105 (step 405). In these illustrative examples, the initial refresh rate 137 is the normal refresh rate 137 as specified in, for example, session sharing tool. As depicted, session sharing tool 121 selects a portion of the shared computer system screen 105 (step 410). In these illustrative examples, a portion of the shared computer system screen 105 can include an application 119 window or can be an application 119 window. That is, in these illustrative examples, a selected portion can be an area of an application 119 window, an application 119 window, or a part of screen 105. In these illustrative examples, screen portions 133 can be selected manually in screen 105 using pointer 117 to select one of windows 115 or draw a box delineating a portion in one of windows 115. In these illustrative examples, a selected portion can also be one of windows 115 selected automatically based on the application type 139, hierarchical arrangement of windows 115, topmost to bottom most, or some other criteria. In these illustrative examples, a user can elect to execute configuration 125 and select the portion of the shared computer system screen 105, i.e. one of screen portions 133, or configuration 125 can occur automatically executed by session sharing tool 121. As depicted, session sharing tool 121 selects a refresh rate for the selected portion of the computer screen 105 (step 415). This can occur manually, with a user of session sharing tool 121 selecting refresh rate 137 as described in FIG. 2 or FIG. 3 in either list 230 or 330 or in refresh rate popup selection box 226 or 326. In these illustrative examples, refresh rate 137 can also be selected automatically based on application type 139 associated with the particular portion or according to a hierarchy based on the relative location of each of windows 115 or application type 139, for example.

As depicted, session sharing tool 121 automatically refreshes the selected portion at the selected refresh rate 137 and portions not selected based on the initial refresh rate 137 (step 420). For example, with reference to FIG. 1 and FIG. 3, each portion 1 310, portion 2 315, portion 320, and portion 4 325 can be associated with a selected refresh rate 137. In these illustrative examples, if session sharing tool 121 selects portion 4 325 with selected refresh rate 137 of 2 Hz, 2 Hz being representative of a highest refresh priority 135, the remaining portions portion 1 310, portion 2 315, and portion 320 can be assigned lower ones of refresh rate 137. Ones of lower refresh rates 137, such as for example 0.5 Hz, 0.1 Hz, and 0.5 Hz respectively for portion 1 310, portion 2 315, and portion 320, can represent a medium, a low, and a medium priority respectively. In these illustrative examples, refresh rates 137 can be selected automatically or manually.

As depicted, session sharing tool 121 next determines if a new portion is selected (step 425). If a new portion is not selected, the process ends, and if a new portion is selected, the process returns to step 420.

Figure 5:
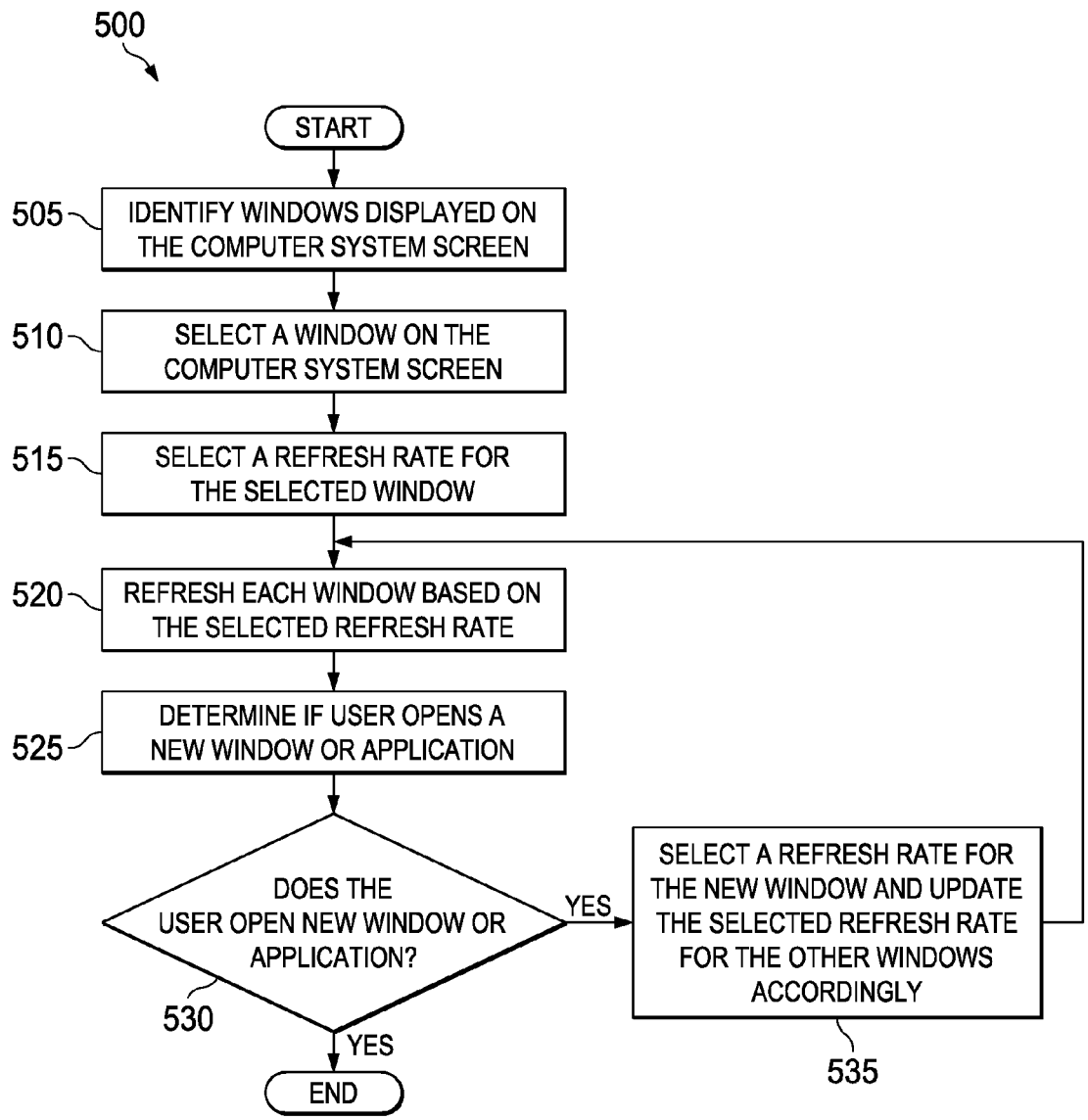
FIG. 5 is an illustration of a flowchart of an action confirmation process implemented during a session sharing on a local computer system in accordance with an illustrative embodiment.

FIG. 5 is an illustration of a flowchart of a session sharing process in accordance with an illustrative embodiment. It should be appreciated that FIG. 5 is only provided as an illustration of one implementation and is not intended to imply any limitation with regard to the session sharing process in which different embodiments may be implemented. Many modifications to the depicted session sharing process may be made.

As depicted, session sharing process 500 can be implemented in session sharing tool 121 of FIG. 1. With references to elements in FIG. 1, as depicted, the process begins when session sharing tool 121 identifies windows 115 displayed on the computer screen 105 (step 505). In these illustrative examples, windows 115 comprise a graphical user interface 109 with applications 119, such that each open window associates with an open application. As depicted, session sharing tool 121 selects a window on the computer screen 105 (step 510). In these illustrative examples, screen 105 displays a set of windows 115, with each of the set of windows 115 associated with one of applications 119. In these illustrative examples, windows 115 can be selected automatically by screen sharing tool 121 (step 510), with each of windows 115 selected by detecting an open and active one of applications 119. "Open application" as used herein means an application currently open and running on local computer system 101. "Active application" as used herein means an open application currently selected for use and generally comprises the topmost window of a hierarchical arrangement of windows 119. As depicted, session sharing tool 121 selects a refresh rate for the selected window (step 515).

In these illustrative examples, both steps 510 and 515 can occur automatically. For example, session sharing tool 121 can automatically select each one of open windows 115, and automatically select a refresh rate based on a hierarchical arrangement of open windows 115. That is, a topmost window can be assigned a highest refresh rate 137 and a bottom most window can be assigned a lowest refresh rate 137. As another example, session sharing tool 121 can select a highest refresh rate 137 for the current active window of windows 115, that is the topmost window currently in use, and a lowest refresh rate selected for each one of non-active windows 115. As another illustrative example, session sharing tool 121 can select a highest refresh rate 137 for the current active window of windows 115 and then select refresh rates 137 for the other active windows 119 based on the application type.

In these illustrative examples, both steps 510 and 515 can occur manually. As depicted, step 510 can be performed by manually selecting a window, such as window 4 225 in FIG. 4. As depicted, Once selected, window 4 225 may have a refresh rate 226 open with a means to select a refresh rate 137, accomplishing step 515. As depicted, as windows 210, 215, 220, and 225 are selected, list 230 can appear, providing a means to select refresh rate 137 for each of windows 210, 215, 220, and 225.

As depicted, session sharing tool 121 refreshes each window based on the selected refresh rate, such as, for example windows 210, 215, 220, and 225 (step 520). As depicted, session sharing tool 121 determines if user opens a new window or application (step 525). If the user does not open a new window or application, the process ends (step 530). If the user does open a new window or application, session sharing tool 121 selects a refresh rate for the new window and updates the selected refresh rate 137 for the other windows accordingly (step 535) before proceeding to step 520.

Figure 6:
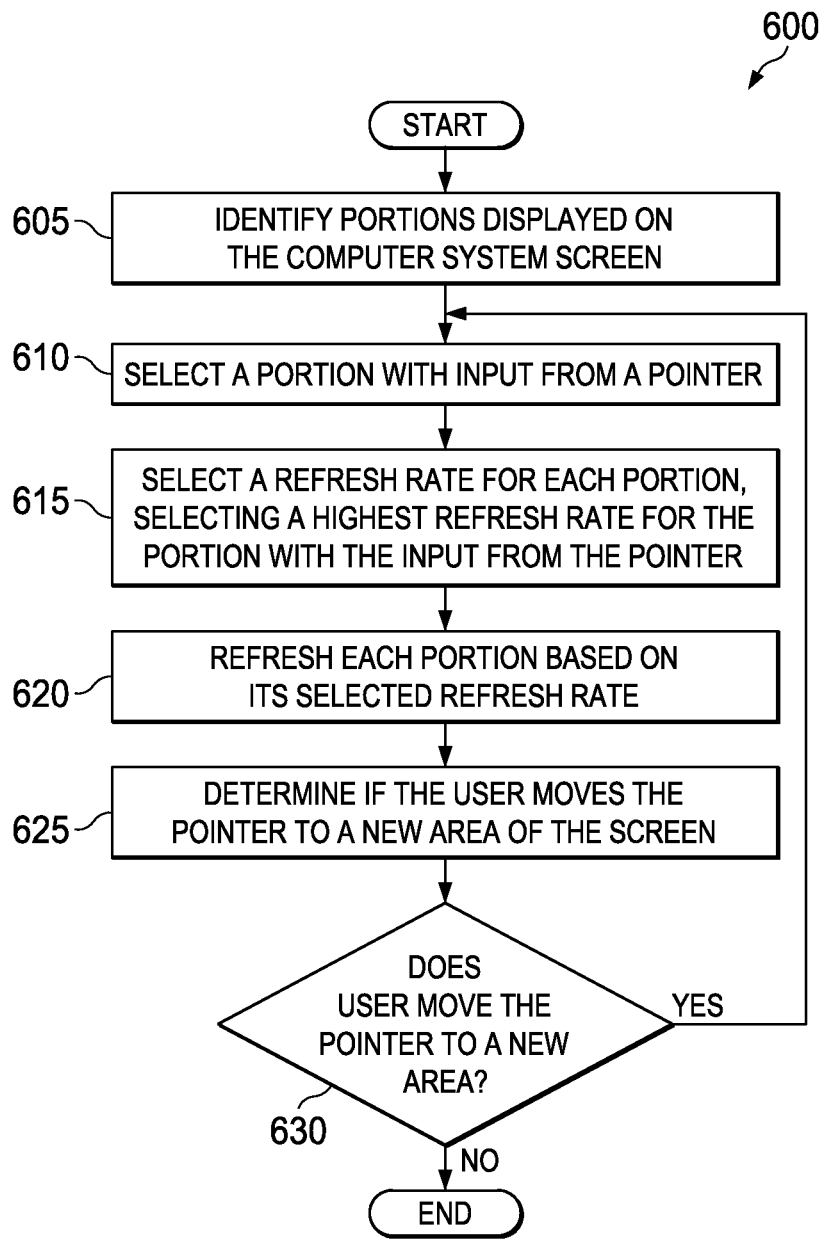
FIG. 6 is an illustration of a flowchart of an action confirmation process implemented during a session sharing on a local computer system in accordance with an illustrative embodiment.

In FIG. 6, an illustration of a flowchart of a session sharing process in accordance with an illustrative embodiment is depicted. It should be appreciated that FIG. 6 is only provided as an illustration of one implementation and is not intended to imply any limitation with regard to the session sharing process in which different embodiments may be implemented. Many modifications to the depicted session sharing process may be made.

As depicted, session sharing process 600 can be implemented in session sharing tool 121 of FIG. 1. With references to elements in FIG. 1, as depicted, the process begins when session sharing tool 121 identifies windows 115 displayed on the computer screen 105 (step 605). As depicted, session sharing tool 121 selects a portion with a pointer 117 input (step 610). In these illustrative examples, with reference to FIG. 3, portion 4 325 represents an area selected within a radius from pointer 327, and as pointer 327 moves, session sharing tool 121 modifies and selects portion 4 325 from the other portions. As depicted, session sharing tool 121 selects a refresh rate 137 for each portion, selecting a highest refresh rate 137 for the portion with input from pointer 117 (step 615). As depicted, session sharing tool 121 refreshes each portion based on its selected refresh rate 137 (620). In step 625, as depicted, session sharing tool 121 determines if the user moves pointer 117 to a new area of screen 305. As depicted, if the user does not move the pointer 117 to a new area, the process ends, and if the user does move the pointer 117 to a new area, the process returns to step 610.

Figure 7:
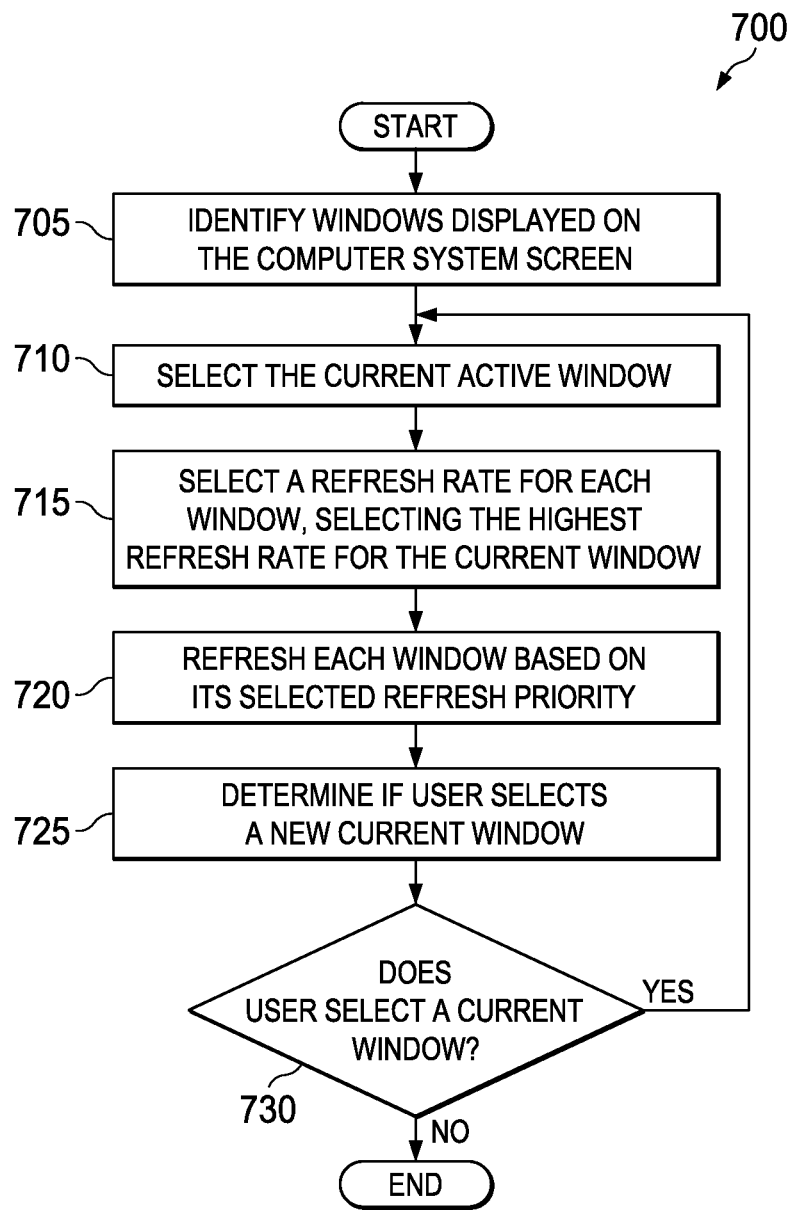
FIG. 7 is an illustration of a data structure used in by a session sharing tool during a session sharing in accordance with an illustrative embodiment.

Turning to FIG. 7, an illustration of a flowchart of a session sharing process in accordance with an illustrative embodiment is depicted. It should be appreciated that FIG. 7 is only provided as an illustration of one implementation and is not intended to imply any limitation with regard to the session sharing process in which different embodiments may be implemented. Many modifications to the depicted session sharing process may be made.

As depicted, session sharing process 700 can be implemented in session sharing tool 121 of FIG. 1. With references to elements in FIG. 1, as depicted, the process begins with session sharing tool 121 identifying windows 115 displayed on the computer screen 105 (step 705). As depicted, session sharing tool 121 selects a current window (step 710). "Current window" as used herein, is the currently focused window and means an active and currently selected, topmost window running an application in a hierarchical windows 115 presentation on screen 105. As depicted, session sharing tool 121 selects a refresh rate 137, selecting the highest refresh rate 137 for the current window (step 715). As depicted, session sharing tool 121 refreshes each window based on its selected refresh priority (step 720). As depicted, session sharing tool 121 determines if a user selects a new current window (step 725). If the user does not select a new current window, the process ends, and if the user does select a new current window, the process returns to step 710 (step 730.

Figure 8:
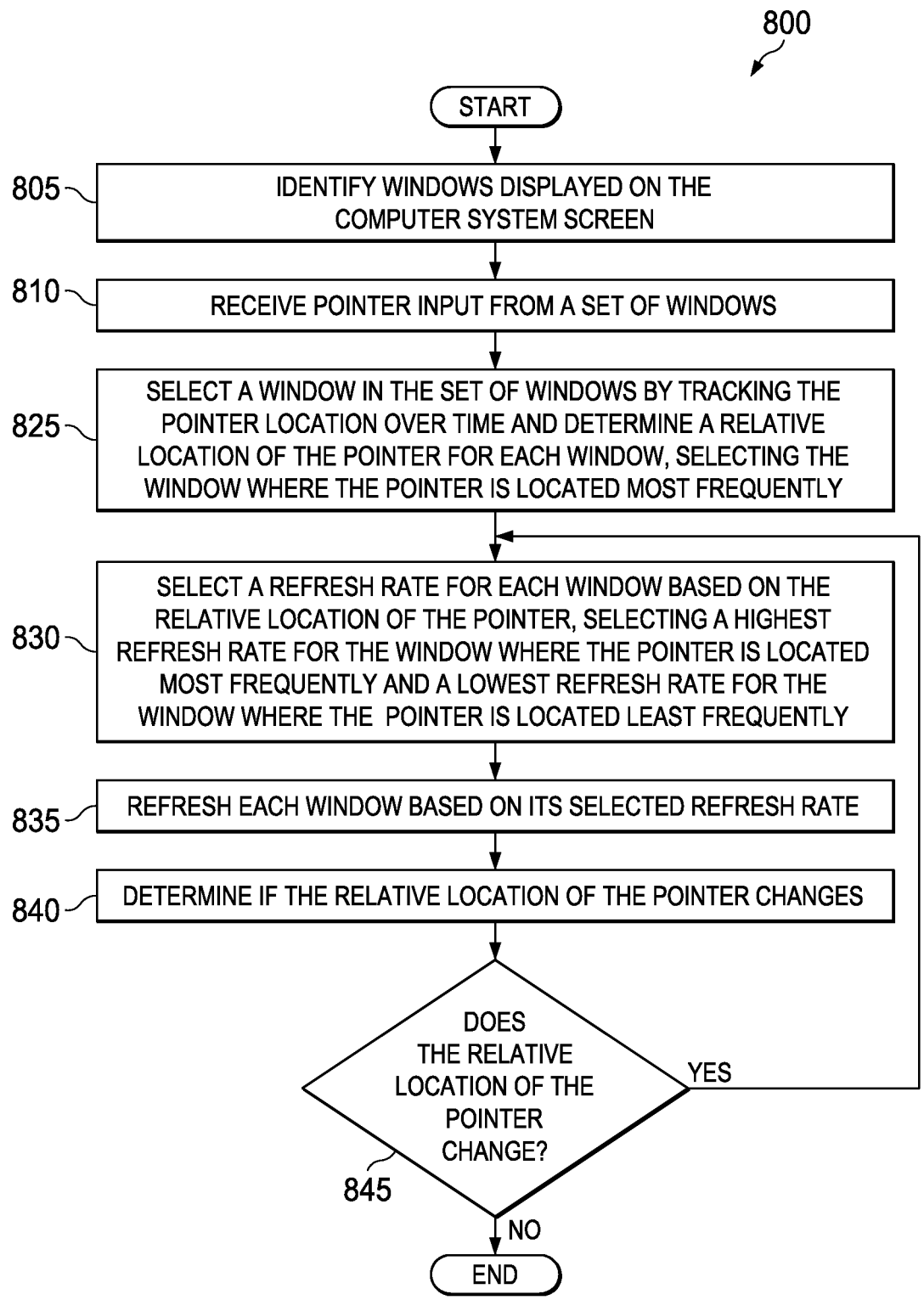
FIG. 8 is an illustration of a data structure used in by a session sharing tool during a session sharing in accordance with an illustrative embodiment.

FIG. 8 is an illustration of a flowchart of a session sharing process in accordance with an illustrative embodiment. It should be appreciated that FIG. 8 is only provided as an illustration of one implementation and is not intended to imply any limitation with regard to the session sharing process in which different embodiments may be implemented. Many modifications to the depicted session sharing process may be made.

As depicted, session sharing process 800 can be implemented in session sharing tool 121 of FIG. 1. With references to elements in FIG. 1, as depicted, the process begins with session sharing tool 121 identifying windows 115 displayed on the computer screen 105 (step 805). As depicted, session sharing tool 121 receives input from pointer 117 from a set of windows 115 (step 810). As depicted, session sharing tool 121 selects a window in the set of windows 115 by tracking pointer 117 location over time and determine a relative location for pointer 117 for each window, selecting the window where pointer 117 is located most frequently (step 825). As depicted, session sharing tool 121 selects a refresh rate 137 for each window based on the relative location of the pointer 117, selecting the highest refresh rate 137 for the window where the pointer 117 is located most frequently and the lowest refresh rate 137 for the window where pointer 117 is located least frequently (step 830). As depicted, session sharing tool 121 refreshes each window based on its selected refresh rate 137 (step 835). As depicted, session sharing tool 121 determines if the relative location of pointer 117 changes (step 840). As depicted, if the relative location of pointer 117 changes, the process returns to step 830, and if the relative location of pointer 117 does not change, the process ends (step 845).

Figure 9:
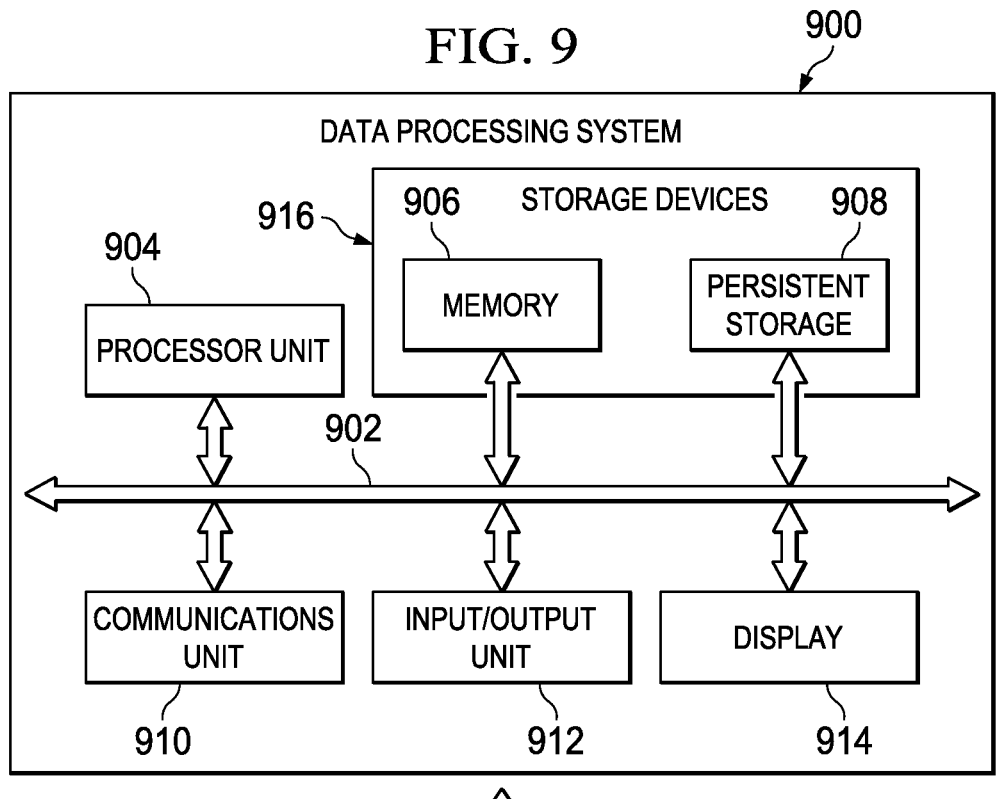
FIG. 9 is an illustration of a block diagram of a data processing system in accordance with an illustrative embodiment.
Figure 9:
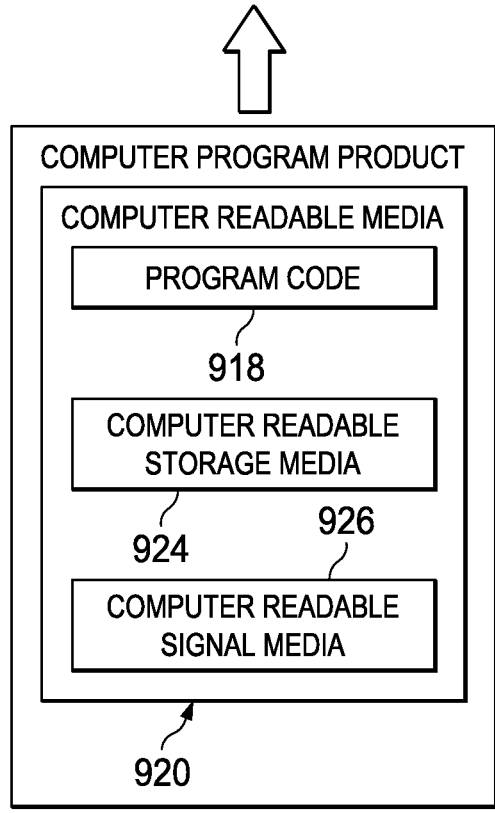

Turning now to FIG. 9, an illustration of a data processing system is depicted in accordance with an advantageous embodiment. Data processing system 900 may be used to implement local computer system 101 in FIG. 1. In this illustrative example, data processing system 900 includes communications framework 902, which provides communications between processor unit 904, memory 906, persistent storage 908, communications unit 910, input/output (I/O) unit 912, and display 914. In this example, communication framework may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 900 are not meant to provide architectural limitations to the manner in which different embodiments may be implemented. The different advantageous embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code 918.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method to set refresh rates for different portions of a shared screen in a sharing session, comprising:
    setting, by a processor, an initial refresh rate for the sharing session, wherein the sharing session is between a display device that displays the shared screen and a remote client device that displays the shared screen;
    selecting, by the processor, a portion of the shared screen;
    selecting, by the processor, a refresh rate for the selected portion of the shared screen that is different from the initial refresh rate for the sharing session, wherein the selected refresh rate is a real number for how often the selected portion of the shared screen is refreshed each second, and wherein the selected refresh rate is selected from one of a first range including a high refresh rate, a medium refresh rate, and a low refresh rate, and wherein the low refresh rate is approximately 0.1 Hz, the high refresh rate is approximately 2 Hz, and the medium refresh rate is one of approximately 0.5 Hz and approximately 0.9Hz; and
    refreshing, by the processor, the selected portion based on the selected refresh rate and a portion not selected based on the initial refresh rate.

2. The computer-implemented method of claim 1, wherein the selected portion comprises an area surrounding a pointer on the screen, wherein the area moves as the pointer moves on the screen.

3. The computer-implemented method of claim 2, wherein the area surrounding the pointer on the screen is a circle having a radius around a location of the pointer.

4. The computer-implemented method of claim 1, further comprising:
    displaying, by the processor, an input on the shared screen for selecting the refresh rate.

5. The computer-implemented method of claim 1, wherein the selected portion comprises a first window and further comprising:
    selecting, by the processor, a refresh rate that is high for a second window receiving an input from a pointer; and
    updating, by the processor, the refresh rate for the first window to a refresh rate that is lower.

6. The computer-implemented method of claim 1, wherein the selected portion comprises a window and further comprising:
    selecting, by the processor, a high priority rate for a window that is currently in use, wherein the window is currently selected and on top of any other window.

7. The computer-implemented method of claim 1, further comprising:
    receiving, by the processor, an input from a pointer in the portion; and
    selecting, by the processor, the portion receiving the input from the pointer.

8. The computer-implemented method of claim 1, further comprising:
    receiving, by the processor, an input from a pointer in a set of portions indicating a location of the pointer;
    tracking, by the processor, the location of the pointer in the set of portions over an interval of time;
    determining, by the processor, the location of the pointer in each portion of the set of portions over the interval of time; and
    selecting, by the processor, the portion of the set of portions where the pointer is located most frequently.

9. The computer-implemented method of claim 8, further comprising:
    selecting, by the processor, a highest refresh rate for the portion of the set of portions where the pointer is located most frequently and a lowest refresh rate for a portion of the set of portions where the pointer is located least frequently.

10. The computer-implemented method of claim 1, wherein the refresh rate selected for the portions not selected is based on a type of application running in each portion.

11. The computer-implemented method of claim 1, wherein the first range further comprises a set of second ranges, each second range comprising a set of values for the high refresh rate, the medium refresh rate, and the low refresh rate respectively.

* * * * *